Patented June 23, 1936

2,044,769

UNITED STATES PATENT OFFICE 2,044,769

PROCESS FOR PREPARING ZEIN

Harry A. Buron, Cambridge, and John Vincent MacDonough, Watertown, Mass., assignors, by mesne assignments, to Arthur D. Little, Inc., a corporation of Massachusetts No Drawing. Application August 7, 1935, Serial No. 35,102

15 Claims. (Cl. 87—28)

This invention relates to zein and to processes for preparing zein; and precipitates the zein in finely divided form as distinguished from a doughy mass enabling it to be washed to yield a purer product than has been commercially possible heretofore and to have an improved form better suited for practical use in the arts.

Processes at present known for recovery of zein from maize ordinarily give a product having a purity of say 85%; purer zein than this has been obtained, but by tedious and expensive operations not well adapted to economic commercial manufacture.

By the process described in this invention it is commercially possible to produce zein of a purity greater than 95%, and approaching 100%. Such a product has a wider and more useful application in the arts than has zein of lesser purity. It may be manufactured or incorporated into products or substances possessing interesting and valuable properties.

The dried products of this invention are obtainable in a relatively finely divided form as a dry, free-flowing product without resort to long and expensive grinding operation. The particles, after drying and without any grinding, range in size from small friable aggregates down to minute, almost dustlike particles. On account of this friable nature they may be very readily crushed without expensive apparatus or process to form a uniform, very fine granular powder, which is light in color, dry, and stable, and without unpleasant odor, and keeps well if not exposed to extremes of moisture and warmth. The product either before or after any crushing operation, is essentially a bulk product, rather than a single solid mass or an aggregate of large individual pieces.

In carrying out the process of this invention, to recover zein from maize a relatively dry gluten meal is the usual starting point for the steps described herewith. First, however, a brief description of the customary method of making gluten will be given.

The kernels of corn, freed from the cob, are steeped in warm water, containing a small quantity of sulphur dioxide as a fermentation preventative and a promoter of the softening action. The corn is then passed through mills adapted to disintegrate the kernels in such a way that the germs may be readily separated, which is done in the next step where the said germs are floated off from a tank of water into which the disintegrated kernels are passed. The kernels, minus the germ, are then very finely ground, and bolted to remove the fibrous husks or skin. The remaining finely ground material, still suspended in water, consists primarily of starch and gluten. The gluten, being slightly lighter, is floated off, and collected, by settling, in reservoirs. Water is removed by pressing the gluten in filter presses, and then drying. In the drying operation, the particles of gluten tend to lump together slightly, giving a product consisting generally of small granules which have for example a diameter ranging from one to two millimeters down to considerably smaller particles.

While it is possible to take gluten from an earlier stage of the process, it is preferable in carrying out this invention to take the dried meal. This meal, being dry, loose and granular, is much more readily penetrated and extracted by solvents than would be the muddy undried gluten. Also, there is relatively little water present, hence there is less interference with the solvent process because of overdilution and necessity for distillation or other effort to separate the water at some stage in the process. The gluten meal prepared as aforesaid will still have associated with it a small amount of starch, which was that not removed by flotation as hereinbefore described. However, if desired, this remaining starch may be readily removed by suitable operations such as diastase treatment.

For some uses of the zein, the presence of starch is immaterial, for others it should be removed. Therefore, the substantial removal of said residual starch is optional depending on the use to which the final zein product is to be put.

The gluten meal is first extracted by suitable solvents and in suitable apparatus to remove the zein, and this extract is then treated by the process of this invention.

Any suitable extracting apparatus may be used, as for example rotary extractors, or a series of percolators. The optimum method and apparatus allow complete penetration of the solvent among and into the particles of gluten meal, satisfactory removal of substantially all the available zein from the meal and conveyance of the zein solution away from the meal, and conservation of the solvent. A particularly satisfactory method is that of percolation, in which a series of say four or five extractors filled with gluten meal are subjected to countercurrent extraction with a suitable zein-solvent.

The details of this method, as applied to a four-extractor unit, may be briefly as follows. Thus assume that the extracting process has been in operation long enough to establish the cycle, the extractors being designated A, B, C and D. The extraction is countercurrent, so that if the most nearly exhausted meal at the moment is in A, the freshest is in D, and the solvent will flow from A towards D. To illustrate further: nearly exhausted meal is in A; fresh solvent is run in and displaces the solvent already therein, the latter quantity of solvent passing into B; similarly from B to C, and C to D, each successive solution containing more zein than the preceding. D contains fresh meal, preferably moistened with a suitable solvent, which may be but is not necessarily the same as the extracting solvent to promote the action of the main zein-solvent. The next step is to pass heated compressed air or other suitable medium into the meal in A to remove the solvent therein together with the remaining extractable zein which is dissolved in the solvent. This solution in turn passes to B, and so on, while from D there issues the thick syrupy liquid which contains the most zein and which is then processed in accordance with the invention.

The exhausted meal in A is removed and replaced by fresh meal, which is then wet with a solvent as already described in the case of D; fresh solvent is passed into B, and the operation proceeds as already described but with A replacing D, B replacing A, C replacing B, and D replacing C. The solution as issuing from the last extractor in any series is, as already mentioned, thick and syrupy and may contain as high as roughly 20 percent total solids, of which the greater amount (say 85%) is zein.

Alternatively, a rotary extractor may be used, either alone or with a series of such extractors. The operation when using rotaries comprises introducing solvent into the extractor, then introducing gluten meal (thus avoiding the step of wetting fresh meal, as in percolation); agitating, allowing settling, and filtering off the solvent through the settled meal and out through the filter valves at the bottom of the extractor. The extracting is preferably carried out hot, say at a temperature of about 145° F. when aqueous ethanol is used for the solvent. If a series of such extractors is used, the countercurrent principle may be employed; if only one is used, holding tanks should be provided for solutions of different strength, and these solutions are employed successively on new batches of meal in a manner basically similar to the countercurrent process.

A number of solvents are suitable for use in the above extraction. Some of these are disclosed in U. S. Patent No. 1,966,604. Suitable solvents include most of the alcohols mixed with water,—for example, ethanol, normal or iso propanol, tertiary butanol, or the like, in the proportions by volume of substantially 40 to 90% of the alcohol and 60 to 10% water. Normal butanol saturated with water may be used. Aqueous ethanol is one of the preferred solvents and may consist of 80% ethanol and 20% water. Denatured alcohols may be used, providing they are compatible with the process and not detrimental to the product. The use of more water than this amount in the solvent is less desirable, as there is a tendency for the gluten meal to swell in the presence of such extra water and thereby block the flow of solvent. The solvent is preferably used hot as already indicated because it is then more effective.

The aforesaid zein extract is then processed as follows to separate the zein from the solvent and to purify it.

There are various ways in which the zein may be separated from the solvent, as by diluting the solution with a relatively large quantity of water. Unfortunately the zein so precipitated is in the form of a doughy mass which is often entirely unsuited for various products and which contains oily and other impurities occluded in the dough which on that account are exceedingly difficult to remove. Moreover, this dough dries into a hard horny mass which it is difficult to pulverize as well as to dissolve.

This invention, however, discloses a method for producing a finely divided precipitate of the zein as distinguished from a doughy mass, which precipitate may be easily purified and is in a form readily usable for further processing in the making of many products. This method involves the control or adjustment of the pH value (hydrogen ion concentration) of the zein solution before precipitating the zein as by diluting the solution. It is known that in usual acid solutions, zein (and accompanying impurities) separates out as a doughy mass, whereas, it has been found that if the solution is strongly alkaline there is a tendency to form a dispersed emulsion; however, according to the present invention it has been found that if the pH of the solution is adjusted to a point ranging from substantial neutrality (say a pH of 6.5) up to moderate alkalinity, a flocculent precipitate can be obtained which may be readily treated and purified. On the alkaline or upper end of the permissible range, the pH value to be employed is largely a question of expediency, for as the alkalinity is increased, the fineness of the product is also increased, thereby lengthening the time necessary for settling or increasing the difficulties of filtration. Actually results have been obtained with a pH ranging up to 12 but for general results the range should not exceed 9.5 and a preferred range involves pH values between 7 and 9.

As an illustrative example of the precipitation step, the solution of zein, for example, a solution thereof in 80% ethanol, is first preferably cooled or allowed to cool below 100° F. Ammonia water is then added to it to give the desired pH, say about 7.4 within the above range. To the well stirred mixture is then added a larger volume of cold water, with constant stirring. About two volumes of water to one of solution is satisfactory. The zein precipitates as a flocculent curdy substance. If desired the pH adjustment may be made by adding the ammonia to the diluting water, instead of to the zein solution; or it may be added in part to each. Care should be used to add the cold water slowly at first, with continuous stirring, until the curd begins to form; the rest of the water is then added more rapidly apparently thus serving to keep the curd from sticking together. Too rapid addition of water may tend to form an emulsion rather than a curd in spite of the pH control though this danger is not great at the pH value specified.

Other substances than ammonia water may be used to control the pH value; e. g. sodium or potassium hydroxide or carbonate, or salts of strong bases, and alkalies generally.

The precipitated zein is then allowed to settle; and the supernatant liquor is siphoned off. This liquor may be treated for recovery of any contained zein, if desired, as by acidifying with for example sulphuric acid, whereupon the zein comes down as a dough. But this step is not essential to the process and may be omitted if desired, the liquor being merely treated for recovery of solvent, or used in any suitable manner.

The zein, after removal of the supernatant liquid, is washed by adding cold water and agitating. The zein is again allowed to settle and the water syphoned off. This cold water washing step is repeated numerous times. The wash water from the first two washes may be saved for distillation and recovery of solvent. The precipitate is too sticky to filter effectively before it is washed. To facilitate the removal of this stickiness, it is preferable to follow four or five of the cold washes with either a warm or a hot water wash. For the former, one may slowly add warm water to the precipitate with continuous stirring so that the temperature of the mixture preferably does not rise above 120° F. approximately. The zein is allowed to settle and the warm water syphoned off. This may be followed with a final cold water wash before the zein is filtered through a light filter cloth and sucked dry.

The zein cake thus provided may be then broken up very finely and air dried preferably while being agitated. The resulting zein product grinds easily and will have a protein content approximating 97%. Moreover, it will be about 95% soluble, viz. substantially completely soluble in cold 80% ethanol; and of course will be soluble in the hot solvent. This zein product, washed only with cold-water-washes or with cold followed by warm water as aforesaid will be, after drying, the final product, whenever cold-alcohol solubility is a desirable or necessary property of said product.

On the other hand, if such solubility is not essential, then an even lighter colored zein may be produced by substituting the warm water by a hot water wash, preferably consisting in boiling the precipitate for a time with water. As before, a final cold washing may be made, but this is optional as the amount of impurities removed is relatively minute. After filtration, the resulting zein cake may be dried by vacuum, air-drying or steam or oven-drying. Where the precipitate has been boiled, drying even at 212° F. does not injure it. The drying takes place with no appreciable change in particle size, except for occasional loose agglomerates which are easily broken up. This hot water washed zein product is soluble in hot aqueous ethanol, etc. but will have lowered solubility in the cold solvent as compared with the previously described product. The cold solubility of the zein product begins to be lowered when the temperature of the warm water wash (following the cold washes) is 130° to 140° F.; and as said wash water temperature is increased, the solubility of the zein product in the cold solvent becomes less and less, until it is only 66% soluble in cold aqueous ethanol when the precipitate after the cold washes has been boiled in water for half an hour with vigorous stirring to reduce the tendency to form lumps.

This boiled product (dried and pulverized) compared to the cold and warm water washed product has properties as follows:—It is less odorous, has a lighter color, is much less soluble in cold solvent; and the precipitate from which the final product is derived, can be dried at 212° F. without agglomeration and reversion into a horny mass. On the other hand, the cold and warm water washed product (dried and pulverized) has high solubility in the cold solvent; but must be dried at relatively low temperature not exceeding, say 150° F., to avoid agglomeration and reversion into a horny mass.

These zein products will have a purity of 97% to 98% or over.

It may be desirable to purify the zein still further, more nearly approaching 100%. This purification will consist primarily in the removal of traces of residual corn oils and fatty acids still associated with the zein; the bulk of these were removed with the supernatant liquor after the zein was first precipitated with pH control. One may use a solvent for such impurities which has no solvent effect upon zein in order to accomplish the purification. Such a solvent may be benzol, carbon tetrachloride, ethyl ether, or any one of several other non-zein solvents. When using such solvents, for example benzol, one may use a trace of acetic acid or the like to neutralize residual alkali left from the controlled pH precipitation step and break down fatty acid soaps, the better to dissolve them. The extraction is most effective when carried on hot. After the extraction step, the zein is dried, and the solvent recovered or otherwise treated as desired.

The zein produced according to this invention is, as already stated, of particularly high purity. Hence it may be used in the manufacture of more desirable and useful articles or substances than can be made with the types of zein ordinarily heretofore produced. The zein may be ground to the powder hereinbefore mentioned, if desired; such grinding requires only simple apparatus and little power, as the zein granules are crumbled readily.

The zein product of this invention is ready for immediate use in the arts, or it may be stored under proper conditions of relatively low humidity and temperature for long periods of time without deterioration, to be used when desired.

The method of preparing zein in accordance with this invention may also be used to purify and improve the form of zein which may have been prepared by other methods. Thus, the doughy or horny, impure zein prepared by other methods is purified by the process of this invention by dissolving said zein as far as possible in the hot solvents specified herein, then precipitating with pH control, and washing and drying the precipitate as herein set forth.

While the preferred carrying out of this invention has been described, for purposes of illustration, with considerable detail, it is to be understood that the inventive concept is capable of expression in a variety of ways and that the scope of the invention is not limited to all the details of the disclosure but is to be ascertained from the appended claims in view of the prior art.

What is claimed is:

1. The process of preparing zein which comprises dissolving the zein in a solvent comprising water and a suitable organic solvent miscible therewith, adjusting the pH of said solution to a value between approximately 6.5 and 12, and precipitating the zein in a finely divided form by reducing the concentration of the organic solvent.

2. A process as specified in claim 1, in which the pH is adjusted to a range between 6.5 and 9.5.

3. A process as specified in claim 1, in which the pH is adjusted to a range between 7 and 9.

4. The process of preparing zein which comprises dissolving the zein in a solvent comprising water and a suitable organic solvent miscible therewith, adjusting the pH of said solution to a value between approximately 6.5 and 12, and precipitating the zein in a finely divided form by largely diluting the solution with water.

5. A process as specified in claim 4, in which such dilution is carried on by adding the water slowly until precipitate is initiated, after which the water is added more rapidly.

6. The process of preparing zein which comprises dissolving the zein with a suitable water soluble organic solvent, diluting the solution with water and thereby precipitating the zein after adjusting the pH of the solution to a value between approximately 6.5 and 12 at which the zein precipitates in finely divided form, as distinguished from a dough when the solution is too acid, or a dispersed emulsion when too alkaline.

7. The process of claim 6 further characterized by removing the liquor and washing the precipitate with cold water, until filterable.

8. The process of claim 6 further characterized by removing the liquor and washing the precipitate with cold followed by heated-water washes, until filterable.

9. The process of claim 6 further characterized by removing the liquor and washing the precipitate with cold water followed by washing it with water heated to between approximately 130° F. to 140° F.

10. The process of claim 6 further characterized by removing the liquor and washing the precipitate with cold water and then boiling the precipitate with water.

11. The process of claim 6 further characterized by removing the liquor and washing the precipitate with cold water followed by washing it with water heated not higher than approximately 130° F. to 140° F., and filtering and drying the precipitate at a temperature not exceeding approximately 150° F.

12. The process of claim 6 further characterized by removing the liquor and washing the precipitate with cold water, then boiling the precipitate with water, and filtering and drying the precipitate in the presence of heat not exceeding a temperature approximating 212° F.

13. The process of preparing zein which comprises dissolving same with a suitable water soluble organic solvent, adjusting the pH of said solution to a value between approximately 6.5 and 9.5 and precipitating the zein in finely divided form by adding water to said solution, removing the liquor and washing the precipitate with water, until filterable.

14. The process of preparing zein which comprises dissolving same with a suitable water soluble organic solvent, adjusting the pH of said solution to a value between approximately 6.5 and 9.5, and precipitating the zein in finely divided form by adding water to said solution, removing the liquor and washing the precipitate with cold followed by heated water washes, until filterable.

15. The process of preparing zein which comprises making a hot solution of the zein with a suitable water soluble organic solvent, cooling said solution and then precipitating the zein by largely diluting the solution with water, after adjusting its pH to a value between approximately 6.5 and 9.5, at which the zein precipitates in finely divided form.

HARRY A. BURON.

CERTIFICATE OF CORRECTION.

Patent No. 2,044,769.  June 23, 1936.

HARRY A. BURON, ET AL.

It is hereby certified that error appears in the above numbered patent requiring correction as follows: Page 4, end of specification, after the signature "HARRY A. BURON" insert the signature of joint inventor, JOHN VINCENT MacDONOUGH; and that the said Letters Patent should be read with this correction therein that the same may conform to the record of the case in the Patent Office.

Signed and sealed this 15th day of September, A. D. 1936.

(Seal)

Henry Van Arsdale
Acting Commissioner of Patents.

7. The process of claim 6 further characterized by removing the liquor and washing the precipitate with cold water, until filterable.

8. The process of claim 6 further characterized by removing the liquor and washing the precipitate with cold followed by heated-water washes, until filterable.

9. The process of claim 6 further characterized by removing the liquor and washing the precipitate with cold water followed by washing it with water heated to between approximately 130° F. to 140° F.

10. The process of claim 6 further characterized by removing the liquor and washing the precipitate with cold water and then boiling the precipitate with water.

11. The process of claim 6 further characterized by removing the liquor and washing the precipitate with cold water followed by washing it with water heated not higher than approximately 130° F. to 140° F., and filtering and drying the precipitate at a temperature not exceeding approximately 150° F.

12. The process of claim 6 further characterized by removing the liquor and washing the precipitate with cold water, then boiling the precipitate with water, and filtering and drying the precipitate in the presence of heat not exceeding a temperature approximating 212° F.

13. The process of preparing zein which comprises dissolving same with a suitable water soluble organic solvent, adjusting the pH of said solution to a value between approximately 6.5 and 9.5 and precipitating the zein in finely divided form by adding water to said solution, removing the liquor and washing the precipitate with water, until filterable.

14. The process of preparing zein which comprises dissolving same with a suitable water soluble organic solvent, adjusting the pH of said solution to a value between approximately 6.5 and 9.5, and precipitating the zein in finely divided form by adding water to said solution, removing the liquor and washing the precipitate with cold followed by heated water washes, until filterable.

15. The process of preparing zein which comprises making a hot solution of the zein with a suitable water soluble organic solvent, cooling said solution and then precipitating the zein by largely diluting the solution with water, after adjusting its pH to a value between approximately 6.5 and 9.5, at which the zein precipitates in finely divided form.

HARRY A. BURON.

CERTIFICATE OF CORRECTION.

Patent No. 2,044,769.      June 23, 1936.

HARRY A. BURON, ET AL.

It is hereby certified that error appears in the above numbered patent requiring correction as follows: Page 4, end of specification, after the signature "HARRY A. BURON" insert the signature of joint inventor, JOHN VINCENT MacDONOUGH; and that the said Letters Patent should be read with this correction therein that the same may conform to the record of the case in the Patent Office.

Signed and sealed this 15th day of September, A. D. 1936.

(Seal)

Henry Van Arsdale
Acting Commissioner of Patents.

CERTIFICATE OF CORRECTION.

Patent No. 2,044,769.   June 23, 1936.

HARRY A. BURON, ET AL.

It is hereby certified that error appears in the above numbered patent requiring correction as follows: Page 4, end of specification, after the signature "HARRY A. BURON" insert the signature of joint inventor, JOHN VINCENT MacDONOUGH; and that the said Letters Patent should be read with this correction therein that the same may conform to the record of the case in the Patent Office.

Signed and sealed this 15th day of September, A. D. 1936.

(Seal)

Henry Van Arsdale
Acting Commissioner of Patents.